United States Patent
Ichinose et al.

(10) Patent No.: US 8,406,965 B2
(45) Date of Patent: Mar. 26, 2013

(54) SYSTEM FOR MONITORING FOR RISK OF ROAD SHOULDER COLLAPSE, AND TRANSPORT VEHICLE

(75) Inventors: Masanori Ichinose, Tsukuba (JP); Tomohiko Yasuda, Kashiwa (JP); Takayuki Sato, Kashiwa (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 305 days.

(21) Appl. No.: 12/819,562

(22) Filed: Jun. 21, 2010

(65) Prior Publication Data

US 2011/0010040 A1    Jan. 13, 2011

(30) Foreign Application Priority Data

Jul. 7, 2009    (JP) .................. 2009-161102

(51) Int. Cl.
| | |
|---|---|
| G01M 17/00 | (2006.01) |
| G06F 7/00 | (2006.01) |
| G06F 11/30 | (2006.01) |
| G06F 19/00 | (2011.01) |
| G06F 7/70 | (2006.01) |
| G07C 5/00 | (2006.01) |
| G06G 7/00 | (2006.01) |
| G06G 7/76 | (2006.01) |
| G06G 7/56 | (2006.01) |
| B60Q 1/00 | (2006.01) |
| B60Q 1/26 | (2006.01) |
| G08G 1/09 | (2006.01) |

(52) U.S. Cl. ...... 701/50; 701/29.1; 340/425.5; 340/438; 340/905; 703/5

(58) Field of Classification Search ................ 701/50
See application file for complete search history.

(56) References Cited

U.S. PATENT DOCUMENTS

| | | | | |
|---|---|---|---|---|
| 5,736,939 | A | * | 4/1998 | Corcoran ............ 340/905 |
| 8,271,165 | B2 | * | 9/2012 | Greiner et al. ......... 701/50 |
| 2004/0215428 | A1 | * | 10/2004 | Bras et al. ............ 703/2 |
| 2007/0094262 | A1 | * | 4/2007 | Suzuki et al. ......... 707/9 |
| 2010/0131182 | A1 | * | 5/2010 | Deegan et al. ........ 701/124 |

FOREIGN PATENT DOCUMENTS

JP         2004-302609         10/2004

OTHER PUBLICATIONS

Robert J. Sas, Jr., Leonard S. Sklar, L Scott Eaton, and Jerry Davis, "A Method for Developing Regional Road-Fill Failure Hazard Assessments Using GIS and Virtual Fieldwork Environmental & Engineering Geoscience", Aug. 2008, v. 14, p. 221-229.*

(Continued)

*Primary Examiner* — Ryan Zeender
*Assistant Examiner* — Allen Chein
(74) *Attorney, Agent, or Firm* — Antonelli, Terry, Stout & Kraus, LLP.

(57) ABSTRACT

Disclosed herein is a shoulder collapse risk monitoring system capable of alerting a driver to a risk of a road shoulder collapse during approach operations to the shoulder.
The system includes: a shoulder shape measuring device 101 that measures a shape and slope angle of a road shoulder around a vehicle; a measurement position identification section 121 that identifies a wheel position relative to the shoulder when the shape and slope angle of the shoulder are measured by the shoulder shape measuring device; a shoulder strength calculating section 122 that calculates, from the shape and slope angle of the shoulder measured by the shoulder shape measuring device, strength of the shoulder at the wheel position identified by the measurement position identification section; a wheel load measuring section 123 that measures a wheel load of the wheel whose position has been identified by the measurement position identification section; and an alert device 105 that presents information on a risk of a collapse of the shoulder at the identified wheel position by comparing the wheel load measured by the wheel load measuring section, with the shoulder strength calculated by the shoulder strength calculating section.

10 Claims, 10 Drawing Sheets

OTHER PUBLICATIONS

Thomas Juster, "Physics, and the Effective Stress Equation, Part 2", updated Jun. 29, 2007, available at http://chuma.cas.usf.edu/~juster/S6/Lslides2.html.*

"Mechanical Simulation's TruckSim Offers Latest Animator and Modeling Improvements", Sep. 9, 2008, available at http://www.carsim.com/publications/pressreleases/trucksim701_sep08.php.*

* cited by examiner

SYSTEM FOR MONITORING FOR RISK OF ROAD SHOULDER COLLAPSE, AND TRANSPORT VEHICLE

BACKGROUND OF THE INVENTION

1. Field of the Invention

The present invention relates to a road shoulder collapse risk monitoring system that presents information on a risk of a road shoulder collapsing when a motor vehicle is brought close to the shoulder. The invention also relates to a transport vehicle including the system.

2. Description of the Related Art

While driving a vehicle, the driver may be required to bring the vehicle close to the shoulder of the road for purposes such as steering clear of oncoming vehicles, on-road obstructions, and other objects. JP-2004-302609-A describes a technique for ensuring operational safety during such an approach to the shoulder by monitoring the distance between the vehicle and the shoulder or an on-road obstruction via a vehicle-mounted camera or the like and if the distance decreases below a predetermined value, alerting the driver to that effect.

During the approach to a shoulder sloped downward from the road surface, since a collapse of the shoulder due to weak ground is likely, it may not always suffice to determine safety only by means of the distance between the vehicle and the shoulder or the like, as in the above conventional technique. This becomes a problem particularly when the vehicle travels past other vehicles on a road that is too narrow for the driver to avoid close proximity to the shoulder. In addition, even if the distance to the shoulder is long enough, on an unpaved road provided primarily in private land and having no reinforcing measures taken for the slope of the shoulder, the possible collapse of the shoulder due to vehicle weight is estimated to result in the vehicle getting stuck in the shoulder. The conventional technique is not designed so as to alert the driver to a risk of such a shoulder collapse. The conventional technique has a problem, therefore, in that although the technique may be effective for preventing the vehicle from obviously slipping outward from the shoulder, too great an advantageous effect cannot be obtained against a collapse risk of the shoulder itself.

An object of the present invention is to provide a shoulder collapse risk monitoring system capable of alerting a driver to a risk of a road shoulder collapse during approach operations to the shoulder.

SUMMARY OF THE INVENTION

In order to achieve the above object, an aspect of the present invention includes: shoulder shape measuring means for measuring a shape and slope angle of a road shoulder around a vehicle; measurement position identification means for identifying a wheel position relative to the shoulder when the shape and slope angle of the shoulder are measured by the shoulder shape measuring means; shoulder strength calculating means for calculating, from the shape and slope angle of the shoulder measured by the shoulder shape measuring means, strength of the shoulder at the wheel position identified by the measurement position identification means; wheel load measuring means for measuring a wheel load of the wheel whose position is identified by the measurement position identification means; and collapse risk information presenting means for presenting information on a risk of a collapse of the shoulder at the wheel position identified by the measurement position identification means by comparing the shoulder strength calculated by the shoulder strength calculating means, with the wheel load measured by the wheel load measuring means.

The present invention alerts the driver to the risk of the shoulder collapse, thus improving safety during the approach of the vehicle to the shoulder.

DESCRIPTION OF THE PREFERRED EMBODIMENTS

Hereunder, embodiments of the present invention will be described with reference to the accompanying drawings.

Figure 1:
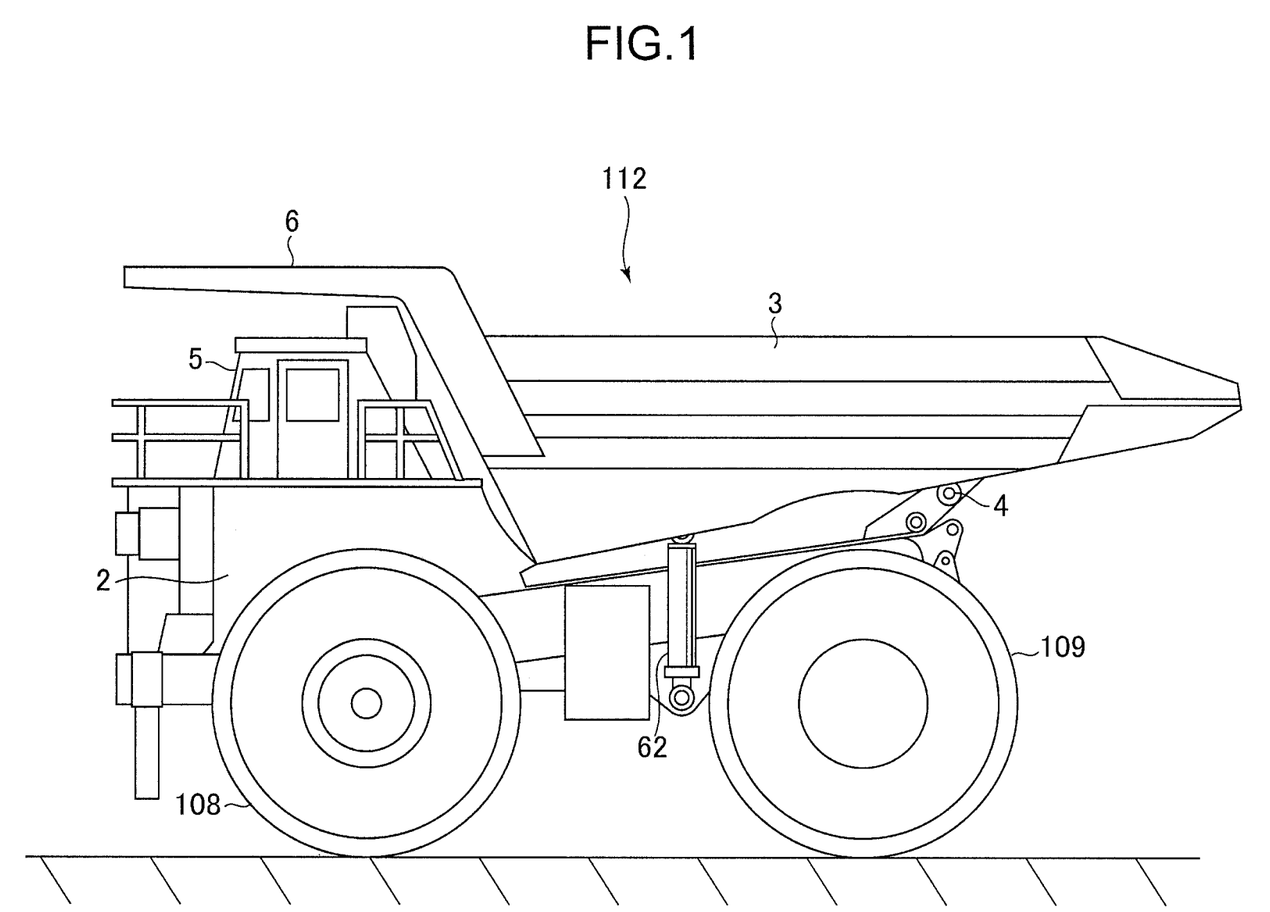
FIG. 1 is a total configuration diagram of a motor vehicle including a road shoulder collapse risk monitoring system according to a first embodiment of the present invention.

FIG. 1 is a total configuration diagram of a motor vehicle including a road shoulder collapse risk monitoring system according to a first embodiment of the present invention. A dump truck, or such a so-called mining as shown in FIG. 1, that is a heavy-duty transport vehicle for carrying the crushed stones mined from an open-air mining field, a quarry, a mine, or other sites, is described herein as an example of a vehicle equipped with a road shoulder collapse risk monitoring system.

The dump truck (vehicle) 112 shown in FIG. 1 primarily includes a dump body 2 formed as a strongly built frame structure, a vessel (loading platform) 3 derrickably mounted on the body 2, and front wheels 108 and rear wheels 109 mounted at a lower side of the body 2.

The vessel 3, provided as a container to accept and hold a load such as crushed stones and rocks is connected in a derrickable condition relative to the body 2, via a pin connector 4 or the like. At a lower section of the vessel 3, two derricking cylinders 62 are installed via a predetermined clearance in a lateral direction of the vehicle. Upon a pressure oil being supplied to/discharged from the derricking cylinders 62, elongating/shortening of the cylinders 62 derricks the vessel 3. A canopy 6 is provided at an upper front section of the vessel 3.

The canopy 6 functions to protect, from flying stones and rocks, a cabin 5 installed thereunder (i.e., a forepart of the body 2), as well as to protect the cabin 5 in the event of the vehicle overturning. Inside the cabin 5 are arranged an accelerator pedal and a brake pedal (neither shown) in addition to a steering wheel 107 and an alert device 105 that alerts the driver to a risk level of a road shoulder collapse (the latter two elements in the cabin are shown in FIG. 2).

The front wheels 108, controlled by a vehicle course control device 106 (see FIG. 2), are rotatably mounted at the front side of the body 2. The vehicle course control device 106 controls steering operation of the front wheels 108 according to a steering angle input via the steering wheel 107 or the like. The rear wheels 109 that are driving wheels are rotatably mounted at a rear side of the body 2.

Figure 2:
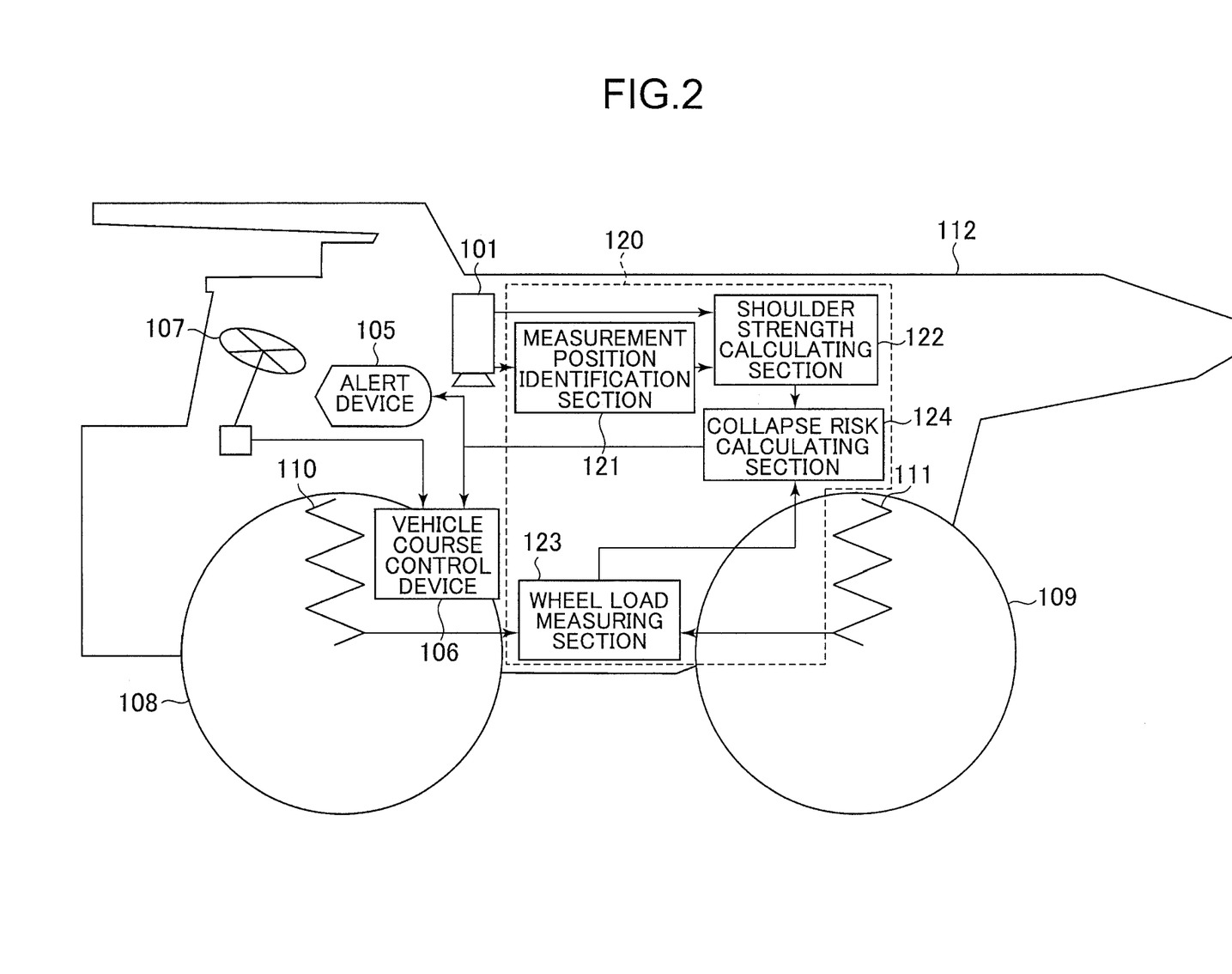
FIG. 2 is a total configuration diagram of the road shoulder collapse risk monitoring system that is the first embodiment of the present invention.

FIG. 2 is a total configuration diagram of the road shoulder collapse risk monitoring system that is the first embodiment of the present invention. The same elements as those of FIG. 1 are each assigned the same reference number and symbol, and description of these elements is omitted. The same also applies to figures that herein follow.

The road shoulder collapse risk monitoring system shown in FIG. 2 is installed in the vehicle 112, and the system includes a shoulder shape measuring device (shoulder shape measuring means) 101, a control device 120, the alert device 105, and the vehicle course control device 106.

The shoulder shape measuring device 101 measures a shape and slope angle of a road shoulder around the vehicle 112 (the shape and the slope angle may be hereinafter termed "shoulder shape data"), and the device 101 is installed on the vehicle 112. The shoulder shape measuring device 101 employed in the present embodiment is a laser radar that uses infrared laser light or the like to optically measure a distance to the road shoulder and then measure shoulder shape data based on a sequence of points obtained during the measurement of the distance. Alternatively, the shoulder shape measuring device 101 may be, for example, a distance detector that uses a millimetric wave array or an ultrasound wave array, or an image recognition device that uses an image acquisition element (camera) to process acquired images and extract distance information therefrom. Shoulder shape data that has been measured by the shoulder shape measuring device 101 is output to a measurement position identification section 121 and a shoulder strength calculating section 122 (both detailed later herein).

Figure 3:
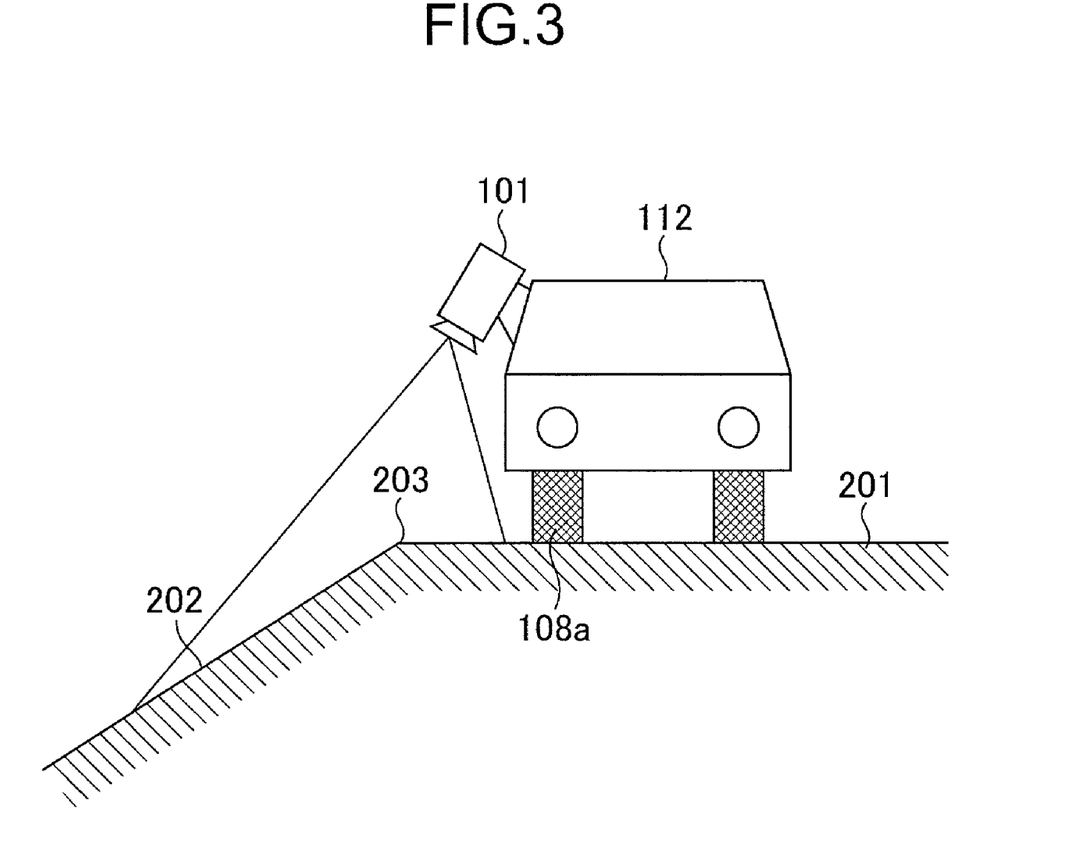
FIG. 3 is a diagram showing an installation situation of a road shoulder shape measuring device in the road shoulder collapse risk monitoring system according to the first embodiment of the present invention.

FIG. 3 is a diagram showing an installation situation of the road shoulder shape measuring device 101 in the first embodiment of the present invention. Referring to FIG. 3, the vehicle 112 is positioned on a planar section 201 of the shoulder, the shoulder itself having a slope 202 directed downward from the planar section 201. For greater ease in the measurement of the shoulder shape data, the shoulder shape measuring device 101 is preferably placed at a position as high as possible above the vehicle 112, as shown in FIG. 3. In addition, for easier identification of the wheel positions on the shoulder during the measurement of the shoulder shape data, the shoulder shape measuring device 101 is more preferably placed to agree with a horizontal position of the wheels.

The control device 120 includes the measurement position identification section (measuring position identification means) 121, the shoulder strength calculating section (shoulder strength calculating means) 122, a wheel load measuring section (wheel load measuring means) 123, and a collapse risk calculating section 124.

The measurement position identification section 121 identifies the position at which the shoulder shape data was measured, this position becoming a reference position for determining the shoulder collapse risk. Identification by the measurement position identification section 121 in the present embodiment uses the position of at least one of the front wheels 108 and the rear wheels 109, as a reference position. The measurement position identification section 121 identifies the reference position on the shoulder during the measurement of the shoulder shape data by the shoulder shape measuring device 101. Additionally, during identification of the reference position, the measurement position identification section 121 uses the shoulder shape data measured by the shoulder shape measuring device 101. More specifically, the measurement position identification section 121 in the present embodiment calculates wheel positions by extracting a boundary 203 between the planar section 201 and slope 202 of the shoulder, from the shoulder shape data, and measuring a distance from the reference position to the boundary 203. The wheel positions that have thus been measured by the measurement position identification section 121 are output to the shoulder strength calculating section 122.

On the basis of the shoulder shape data measured by the shoulder shape measuring device 101, the shoulder strength calculating section 122 calculates strength (withstand load) of the shoulder at the reference position measured by the measurement position identification section 121. In the present embodiment, shoulder strength at the wheel positions measured by the measurement position identification section 121 is calculated from the shoulder shape data. In general, when the shoulder has such a slope as the slope 202, a shear stress that is force causing a sliding failure, and shear resistance that is force preventing the sliding failure occur in the ground. Methods of calculating shoulder strength include one that uses a maximum value (shear strength) of the shear resistance as the shoulder strength.

The wheel load measuring section 123 measures wheel loads of the vehicle. The wheel load measuring section 123 in the present embodiment measures the wheel loads of the wheels whose positions were identified by the measurement position identification section 121. The wheel loads that have thus been measured by the wheel load measuring section 123 are output to the collapse risk calculating section 124.

Methods of wheel load measurement by the wheel load measuring section 123 include one that uses the amount of deflection of suspensions 110 and 111 (see FIG. 2) that are installed at the front wheels 108 and the rear wheels 109, respectively. In the present embodiment, the amount of deflection of the suspensions 110, 111 is output to the wheel load measuring section 123, which then calculates a wheel load of the reference wheel from the amount of deflection. Given a known spring constant of the suspension 110, 111, the wheel load can be calculated more easily by integrating the spring constant with the amount of deflection. An alternative to this method of calculating the wheel load may be by connecting a strain sensor as a strain gauge to a constituent part of the suspension 110, 111 and calculating a stress applied to the strain gauge. If the suspension 110, 111 is of a hydraulic or pneumatic type that uses a hydraulic or pneumatic working fluid, the wheel load can likewise be measured easily and accurately by measuring a pressure of the working fluid.

The collapse risk calculating section 124 compares the wheel load measured by the wheel load measuring section 123, with the shoulder strength calculated by the shoulder strength calculating section 122, then calculates an allowance of the shoulder strength for the wheel load, and calculates a collapse risk level of the shoulder from a magnitude of the allowance. The collapse risk calculating section 124, along with the alert device 105 detailed later herein, constitutes a collapse risk information presenting means.

When the calculated collapse risk level exceeds a threshold level, the collapse risk calculating section 124 in the present embodiment alerts the driver in that timing and is constructed so that only when the threshold level of the collapse risk is exceeded, will the calculating section 124 output a signal to the alert device 105 to indicate that the collapse risk is high. In terms of the alert timing, the alert process may be conducted when an allowance decreases below a fixed value (i.e., when a threshold value of the shoulder strength level relative to a magnitude of the wheel load is exceeded and the allowance is used up) or when the wheel load exceeds the shoulder strength.

The alert device 105 is designed to present to the driver the information indicating that the collapse risk level calculated by the collapse risk calculating section 124 is high, or to present the collapse risk level to the driver, and is placed in the cabin of the vehicle 112. The alert device 105 can be a display device that uses characters and/or graphics to display the collapse risk level (e.g., a high-resolution monitor), an alarm device that issues an appropriate voice or buzzer signal to indicate that the collapse risk has exceeded the threshold level, or a warning lamp that lights up to indicate that the collapse risk has exceeded the threshold level (e.g., a warning lamp provided in an instrument panel). Alerting the driver to the collapse risk in this manner allows the system to effectively transmit to the driver the information indicating that the collapse risk is high.

Next, operation of the shoulder collapse risk monitoring system having the above-described configuration is described below.

Figure 4:
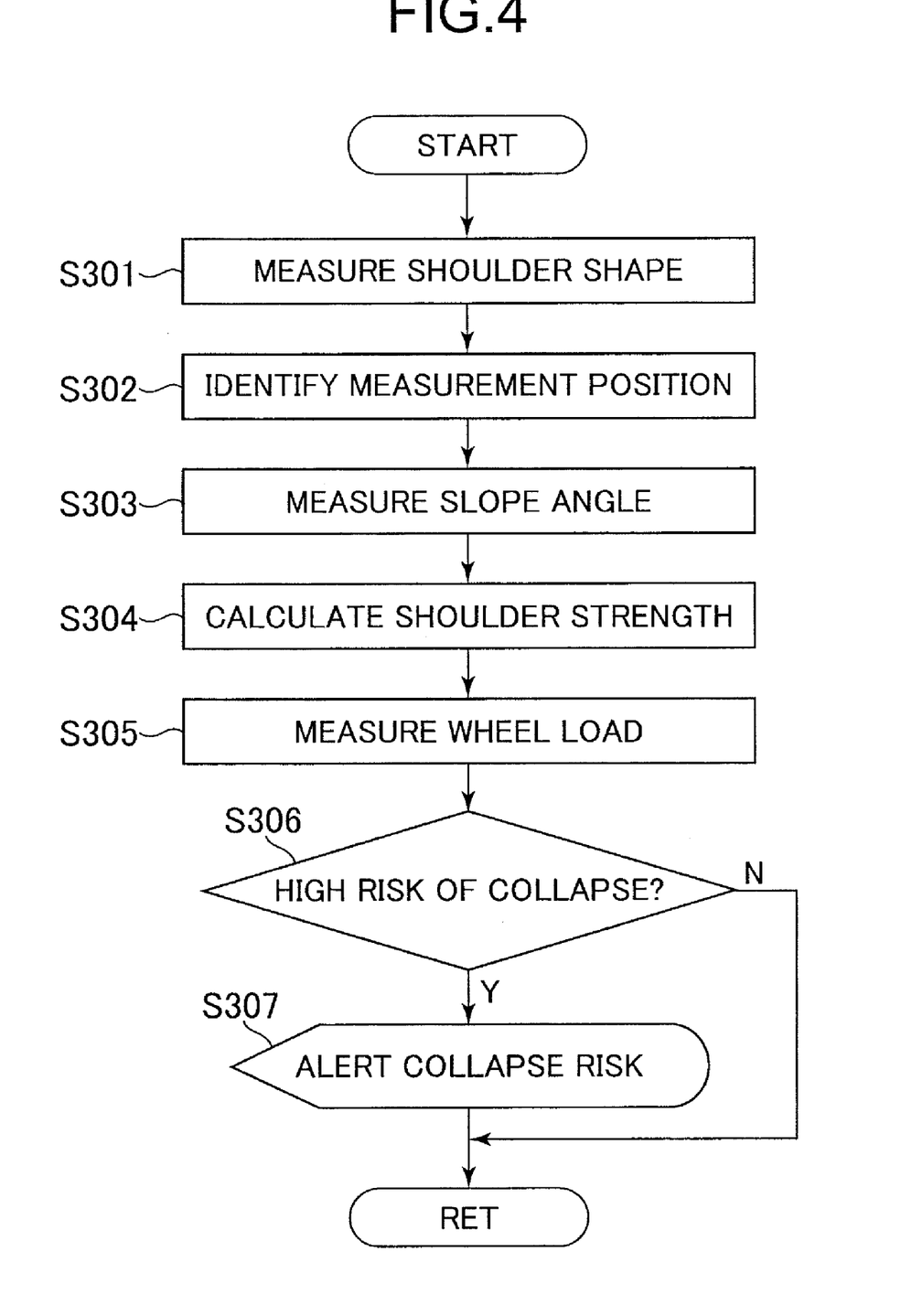
FIG. 4 is a flowchart of a collapse risk calculation process in the road shoulder collapse risk monitoring system according to the first embodiment of the present invention.

FIG. 4 is a flowchart of the collapse risk calculation process in the road shoulder collapse risk monitoring system according to the first embodiment of the present invention. This flowchart assumes that while the vehicle 112 is traveling, the process in FIG. 4 is repeated at fixed time intervals.

After a call of the process shown in FIG. 4, the system first activates the shoulder shape measuring device 101 to measure the shape of the shoulder around the vehicle (step S301). Next, on the basis of the shoulder shape data measured in step S301, the measurement position identification section 121 calculates the wheel position of the reference position by extracting the boundary 203 and measuring the distance from the reference position to the boundary 203 (step S302). Hereinafter, for the sake of simplicity in description, of the front wheels 108, only the wheel 108a positioned closer to the shoulder (the slope 202) is defined as the reference wheel (see FIG. 3 for this wheel). After the position of the reference wheel 108a has been calculated, the shoulder shape measuring device 101 extracts the slope 202 positioned externally to the planar section 201 (boundary 203), from the shoulder shape data measured by the device 101, and measures a slope angle of the slope 202 (step S303). The slope angle may be measured together with the shape of the shoulder, in step S301.

After the measurement of the shoulder shape data (the shape and slope angle of the shoulder), the shoulder strength calculating section 122 calculates the shoulder strength at the position of the wheel 108a from the shoulder shape data (step S304). Meanwhile, the wheel load measuring section 123 uses the sensor or the like on the suspension 110, 111 to measure the wheel load of the wheel 108a (step S305).

Next, the collapse risk calculating section 124 compares the shoulder strength calculated by the shoulder strength calculating section 122, with the wheel load measured by the wheel load measuring section 123, and calculates the collapse risk at the position of the wheel 108a. After this, the collapse risk calculating section 124 determines whether the allowance for the shoulder strength at the position of the wheel 108a has reached a lower threshold level or whether the wheel load of the wheel 108a has exceeded the shoulder strength level (step S306). If, in step S306, the allowance has reached the lower threshold level or the wheel load has exceeded the shoulder strength level, the collapse risk calculating section 124 presents appropriate information to the driver via the alert device 105 to indicate that the shoulder has a high collapse risk (step S307). Unless the collapse risk calculating section 124 determines in step S306 that the shoulder has a high collapse risk, the system completes the above succession of process steps and waits for next process to be started.

As is evident from the above description, the collapse risk monitoring system according to the present embodiment includes the shoulder shape measuring device 101 that measures shoulder shape data, the measurement position identification section 121 that identifies the positions of the wheels on the shoulder whose shape data has been measured, the shoulder strength calculating section 122 that calculates the shoulder strength at the wheel position from the shoulder shape data, the wheel load measuring section 123 that measures a wheel load of the reference wheel, the collapse risk calculating section 124 that calculates the collapse risk of the shoulder at the wheel position by comparing the wheel load with the shoulder strength, and the alert device 105 that presents the calculated collapse risk of the shoulder.

According to the collapse risk monitoring system of the above configuration, if the collapse risk of the shoulder at a current wheel position increases, the driver can be alerted to the increase and thus the safety of the driver can be improved when the vehicle is brought close to the shoulder. In particular, the dump truck earlier discussed as an application of the present invention is likely to need to travel along a road within private land not provided with any reinforcing measures for a sloped shoulder. This increases a tendency for dump truck drivers to have an opportunity to drive on shoulders of a high collapse risk, so the present invention yields more significant effects than when applied to general vehicles. Additionally, since vehicle weights of such transport vehicles as dump trucks depend upon whether they are carrying a load, wheel loads may not exceed shoulder strength levels until the vehicle has been loaded. For these reasons, an advantageous effect of the present invention which determines the collapse risk by comparing the wheel load with the shoulder strength, as described above, becomes significant particularly in transport vehicles. For example, some specific types of dump trucks operating at open-air mining sites (these vehicles are called mining dump trucks) are as great as several hundreds of tons in loading weight, and the vehicle weights of these types of vehicles change significantly, which renders the effectiveness of the present invention even more significant. Because of their large vehicle bodies, these types of dump trucks also tend to make it relatively difficult for the driver to recognize vehicle width, and this produces a significant effect particularly during the above-described approach operations to the shoulder when the collapse risk is alerted.

While the collapse risk calculating section 124 in the above description has assumed that the collapse risk is output to the alert device 105 only if the risk exceeds the threshold level, the calculating section 124 may be constructed to constantly output the collapse risk to the alert device 105 and constantly present the level of the collapse risk to the driver in the form of digital data or characters. Thus presenting the level of the collapse risk to the driver allows the driver to readily understand any changes in risk, associated with steering. Traditionally, avoidance of a shoulder collapse during an approach to the shoulder has relied much upon the driver's experience and hunch. If any changes in risk are digitally presented in the above way, however, information that enables the driver to perform streamlined size-up with respect to the collapse risk can be presented to the driver. This, in turn, enables the driver to avoid an obstruction with an appropriate clearance according to the particular shape of the shoulder. As a result, road design costs can be reduced since no need arises for the driver to drive past oncoming vehicles with a road width margin greater than that actually required, and to provide the sloped shoulder with an excessive reinforcing measure in a traveling zone free of such passing events.

A risk of a shoulder collapse primarily during forward traveling of the vehicle can be monitored if the wheel 108a of the front wheels that is the closest to the shoulder is selected as the reference wheel to be used as the reference position for determining the shoulder collapse risk. Conversely, a risk primarily during reversing can be monitored if the wheel of the rear wheels 109 that is the closest to the shoulder is selected as the reference wheel. In addition, for a transport vehicle having the vessel 3 at rear, as with the dump truck in the present embodiment, one of the rear wheels is preferably selected as the reference wheel, since the wheel loads of the rear wheels 109 tend to increase above those of the front wheels 108. It goes without saying that at this time, all wheels or all front and rear wheels close to the shoulder can be selected as reference wheels.

Furthermore, instead of a wheel position being selected as a reference position as described above, the vehicle position itself may be selected as the reference position. In this case, the system can be made to activate the measurement position identification section 121 to identify the vehicle position relative to the shoulder existing when the shoulder shape data is measured, the shoulder strength calculating section 122 to calculate the strength of the shoulder at the vehicle position, the wheel load measuring section 123 to measure a total wheel load of the vehicle, and the collapse risk calculating section 124 to compare the calculated total wheel load with shoulder strength. Operational safety during the approach of the vehicle to the shoulder can likewise be improved by constructing the collapse risk monitoring system in that way.

Figure 5:
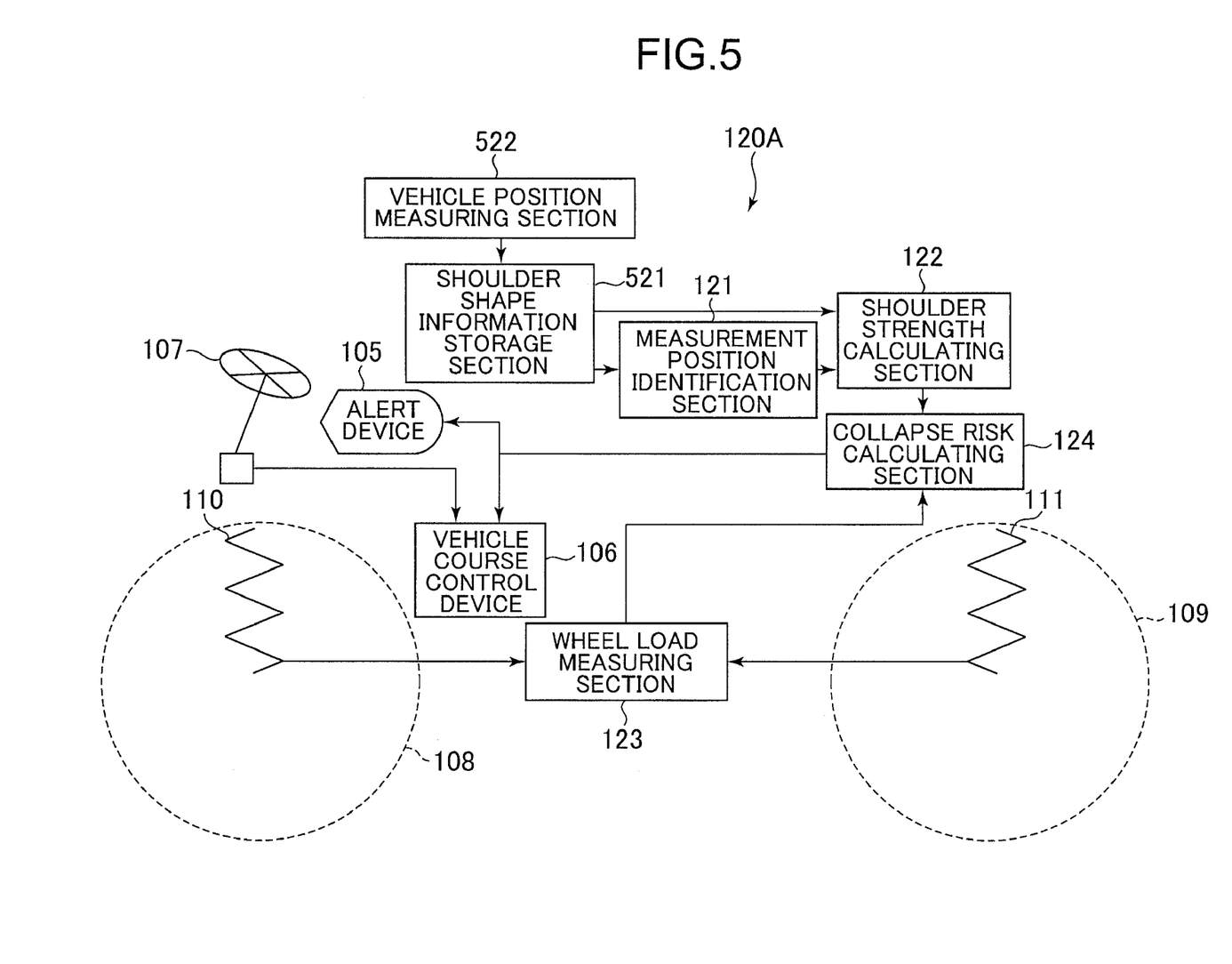
FIG. 5 is a total configuration diagram of a road shoulder collapse risk monitoring system which is a second embodiment of the present invention.

FIG. 5 is a total configuration diagram of a road shoulder collapse risk monitoring system which is a second embodiment of the present invention. The collapse risk monitoring system shown in FIG. 5 differs from that of the first embodiment in that the former includes a shoulder shape information storage section 521 and a vehicle position measuring section 522.

The shoulder shape information storage section (shoulder shape information storage means) 521 retains data on the shape and slope angle of a shoulder at any position, and this section is installed in the vehicle 112. The vehicle position measuring section (vehicle position measuring means) 522 measures the vehicle position relative to the shoulder, and is installed in the vehicle 112. More specifically, the vehicle position measuring section 522 is, for example, a device based on GPS (Global Positioning System), and this device can measure the vehicle position.

In the collapse risk monitoring system of the above-described configuration, when the shoulder shape data at the vehicle position measured by the vehicle position measuring section 522 is read out from the shoulder shape information storage section 521 and then the read data is defined as the shoulder shape data obtained around the vehicle, data on the shoulder shape around the vehicle can be acquired without constantly acquiring shoulder shape data on-line using the shoulder shape measuring device 101 as in the first embodiment.

In the collapse risk monitoring system of the first embodiment, laser-light scanning measurement of the shoulder shape by the shoulder shape measuring device 101 is likely to become difficult under rainy, foggy or misty, or other unfavorable weather conditions. If the shoulder shape data is prestored into the vehicle 112 in the above way, however, shoulder collapse risk information can be presented, even under the rainy, foggy or misty, or other unfavorable weather conditions making it difficult for the shoulder shape measuring device 101 to measure the shoulder shape.

Figure 6:
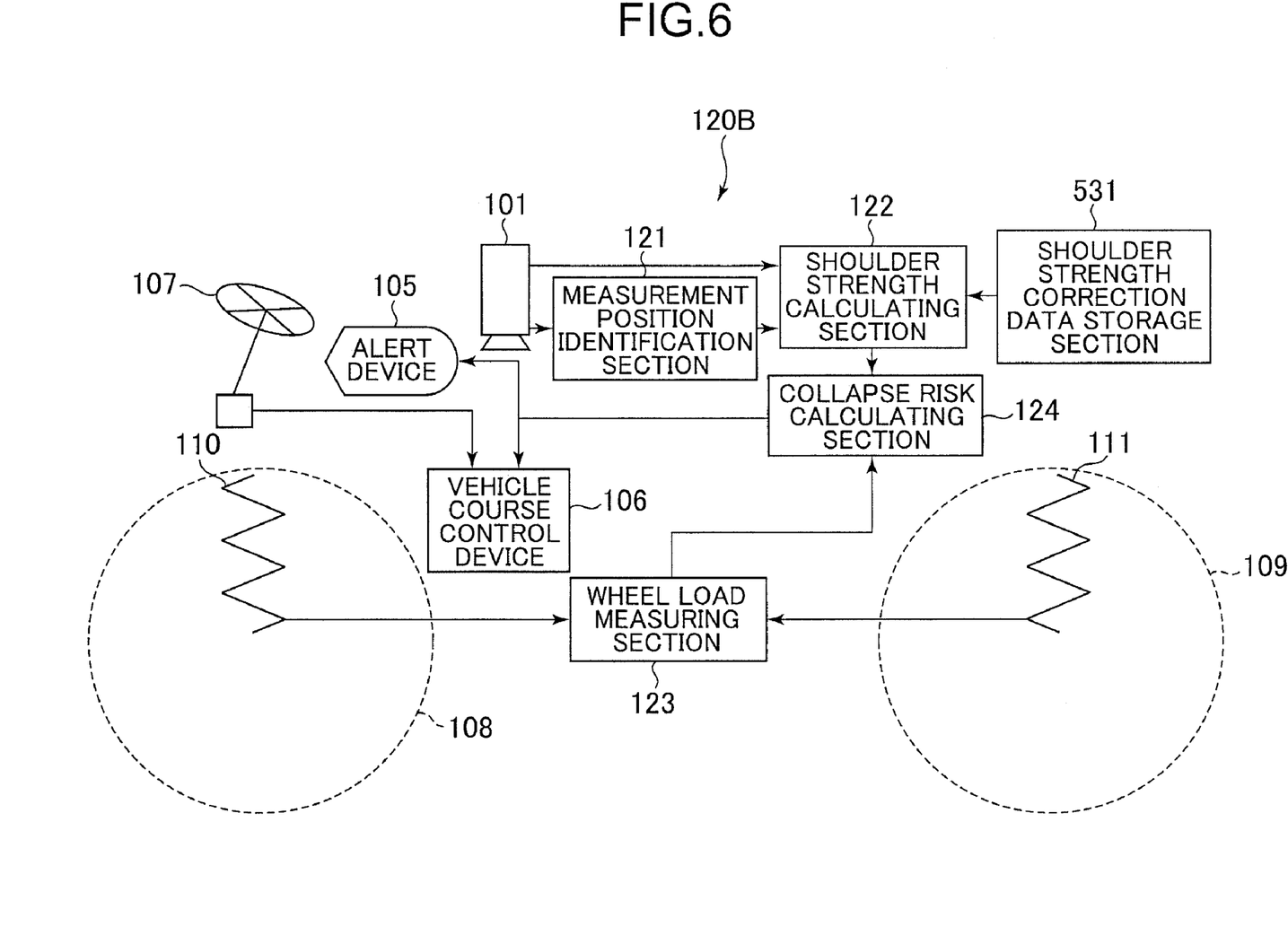
FIG. 6 is a total configuration diagram of a road shoulder collapse risk monitoring system which is a third embodiment of the present invention.

FIG. 6 is a total configuration diagram of a road shoulder collapse risk monitoring system which is a third embodiment of the present invention. The collapse risk monitoring system shown in FIG. 6 differs from that of the first embodiment in that the former includes a shoulder strength correction data storage section 531.

The shoulder strength correction data storage section (shoulder strength correction data storage means) 531 retains correction parameters (correction data) used for the shoulder strength calculating section 122 to calculate shoulder strength. The shoulder strength calculating section 122 calculates shoulder strength using the correction parameters stored in the shoulder strength correction data storage section 531. The kinds of correction parameters here include, for example, soil quality parameters that incorporate characteristics of soil quality under a traveling environment of the vehicle, and weather parameters that incorporate changes in the quantity of water retention in sediments due to weather changes. Shoulder strength varies with soil quality. Using the soil quality parameters to calculate shoulder strength makes calculable the shoulder strength matching the soil quality of the traveling environment. In addition, while an increase in the quantity of water retention in the ground is generally known to reduce strength of the ground, the quantity of water retention in the ground is difficult to be acquired via the shoulder shape measuring means 101, and thus this quantity is preferably made separately settable as a correction parameter. The driver may set the appropriate weather parameters via an input device according to the particular weather conditions such as rain, or all necessary weather parameters may be simultaneously transmitted from a control center or the like, through a wireless device, to the vehicle.

Constructing the collapse risk monitoring system as described above allows the system to calculate the shoulder strength matching the soil quality of the traveling environment, hence to calculate the shoulder strength matching the particular changes in weather, and thus to determine a collapse risk that matches actual road-surface conditions.

Figure 7:
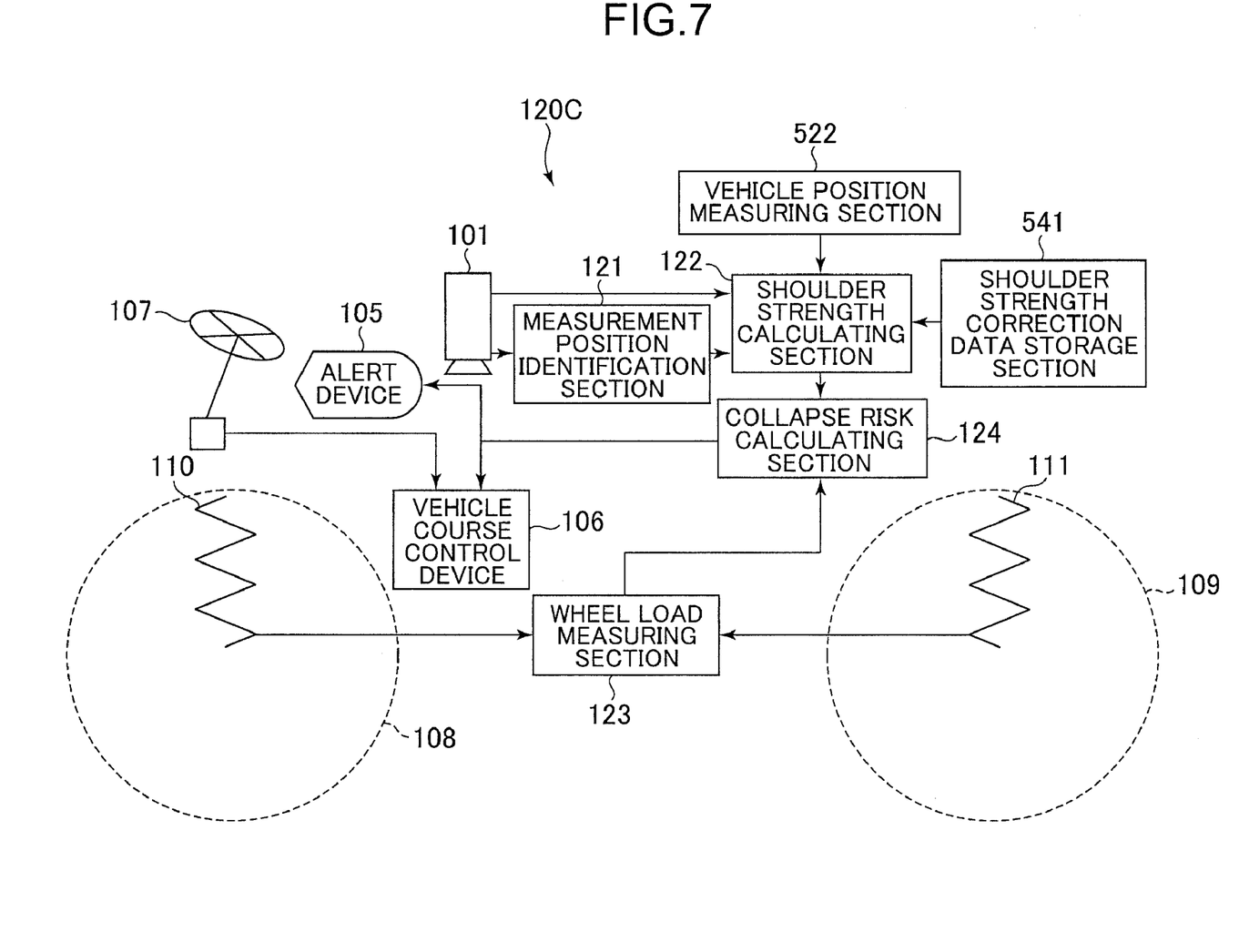
FIG. 7 is a total configuration diagram of a road shoulder collapse risk monitoring system which is a fourth embodiment of the present invention.

FIG. 7 is a total configuration diagram of a road shoulder collapse risk monitoring system which is a fourth embodiment of the present invention. The collapse risk monitoring system shown in FIG. 7 differs from that of the first embodiment in that the former includes a shoulder strength correction data storage section 541 and a vehicle position measuring section 522.

The shoulder strength correction data storage section 541, unlike the shoulder strength correction data storage section 531 in the third embodiment, retains correction parameters in association with position information. For example, if the foregoing weather parameters are taken by way of example, when the area in which the vehicle 112 travels has some degree of breadth, there may be a situation having a dry road surface in some place and a wet road surface due to concentrated rainfall or the like in some other place. In the shoulder strength correction data storage section 541, therefore, correction parameters are stored in association with position information to make the correction parameters modifiable according to position.

The shoulder strength calculating section 122 in the collapse risk monitoring system having the above configuration reads from the shoulder strength correction data storage section 541 the correction parameters corresponding to the vehicle position measured by the vehicle position measuring section 522, and then uses the read correction parameters to calculate shoulder strength. Thus, even if the correction parameters change according to the measured vehicle position, shoulder strength can be calculated using the correction parameters corresponding to the vehicle position, so that the system can determine a collapse risk that better suits actual road-surface conditions than in the third embodiment.

Figure 8:
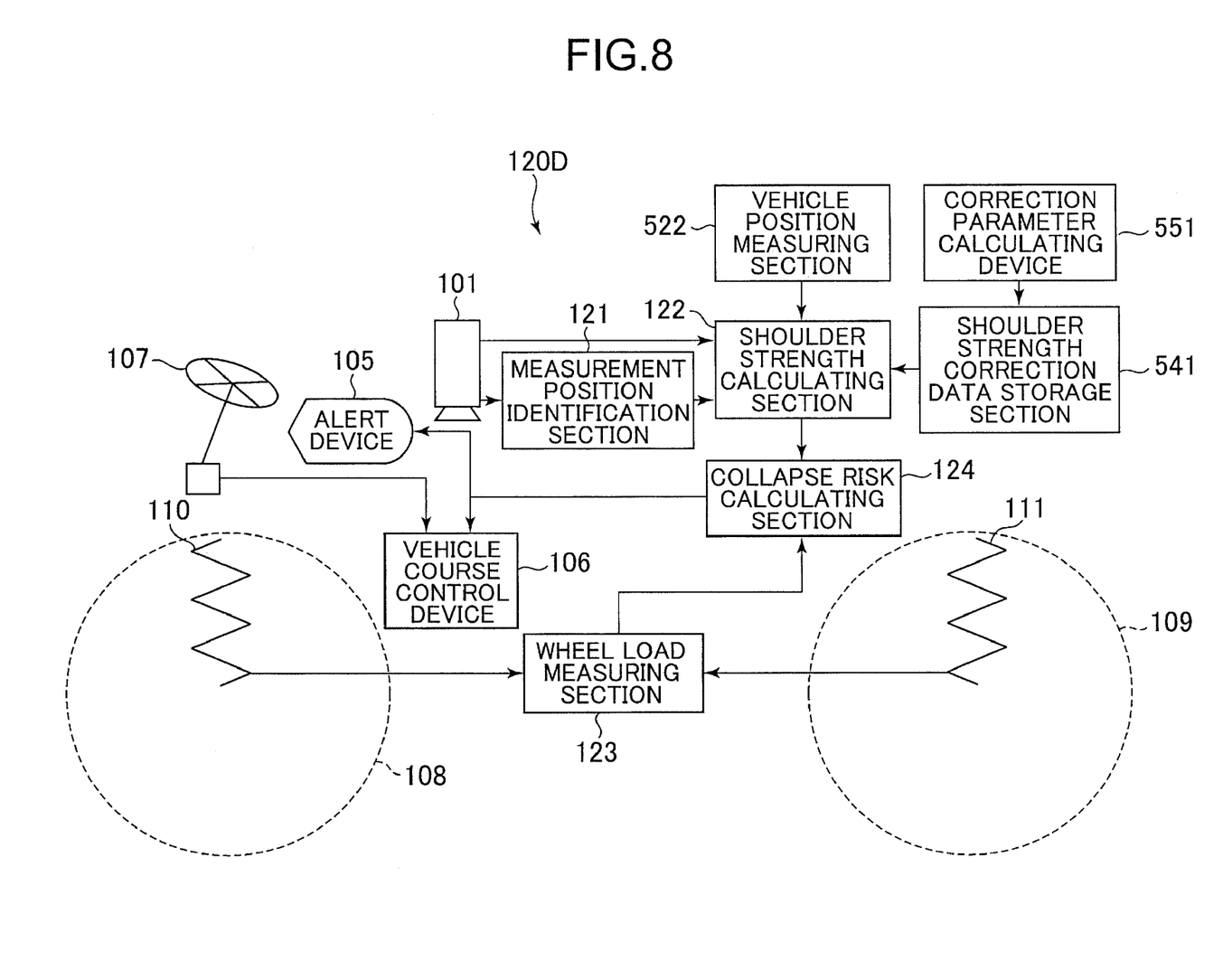
FIG. 8 is a total configuration diagram of a road shoulder collapse risk monitoring system which is a fifth embodiment of the present invention.

FIG. 8 is a total configuration diagram of a road shoulder collapse risk monitoring system which is a fifth embodiment of the present invention. The collapse risk monitoring system shown in FIG. 8 differs from that of the fourth embodiment in that the former includes a correction parameter calculating device (correction parameter calculating means) 551.

The correction parameter calculating device 551 measures a state of a road surface around the vehicle 112 and calculates correction parameters corresponding to the road surface state. The calculating device 551 is installed in or on the vehicle 112. Examples of this measuring device are of a type that irradiates the road surface with ultrasound waves or radio waves and measures hardness of the ground from states of respective reflected waves, or a type that estimates the kind of material, soil quality, and water retention quantity of the road surface, from road surface images that have been acquired using a camera or the like.

The shoulder strength correction data storage section 541 in the collapse risk monitoring system having the above configuration retains the correction parameters calculated by the correction parameter calculating device 551, as new correction parameters corresponding to the measuring position of the road surface state. That is to say, the correction parameters stored within the shoulder strength correction data storage section 541 are replaced as appropriate by correction parameters collected while the vehicle is traveling. Thus, the stored correction parameters are always retained in the newest condition. Since the correction parameters are thus sequentially updated to incorporate measurement results of the correction parameter calculating device 551, the system can determine a collapse risk that much better suits actual road-surface conditions than in the fourth embodiment.

Although the correction parameter calculating device 551 in the present embodiment has been installed in or on the vehicle, the correction parameters inside the shoulder strength correction data storage section 541 may be updated by setting up a plurality of correction parameter calculating devices in various positions at a traveling site for the vehicle, and collecting measured data. For example, if a plurality of rainfall sensors for measuring rainfalls are arranged as one such form of correction parameter calculating device, the water retention quantities of the ground at the locations of the rainfall sensors can be estimated. In addition, correction parameters may be collected by separately providing a correction parameter calculation-dedicated vehicle having the correction parameter calculating device 551, and driving this vehicle in the site.

Figure 9:
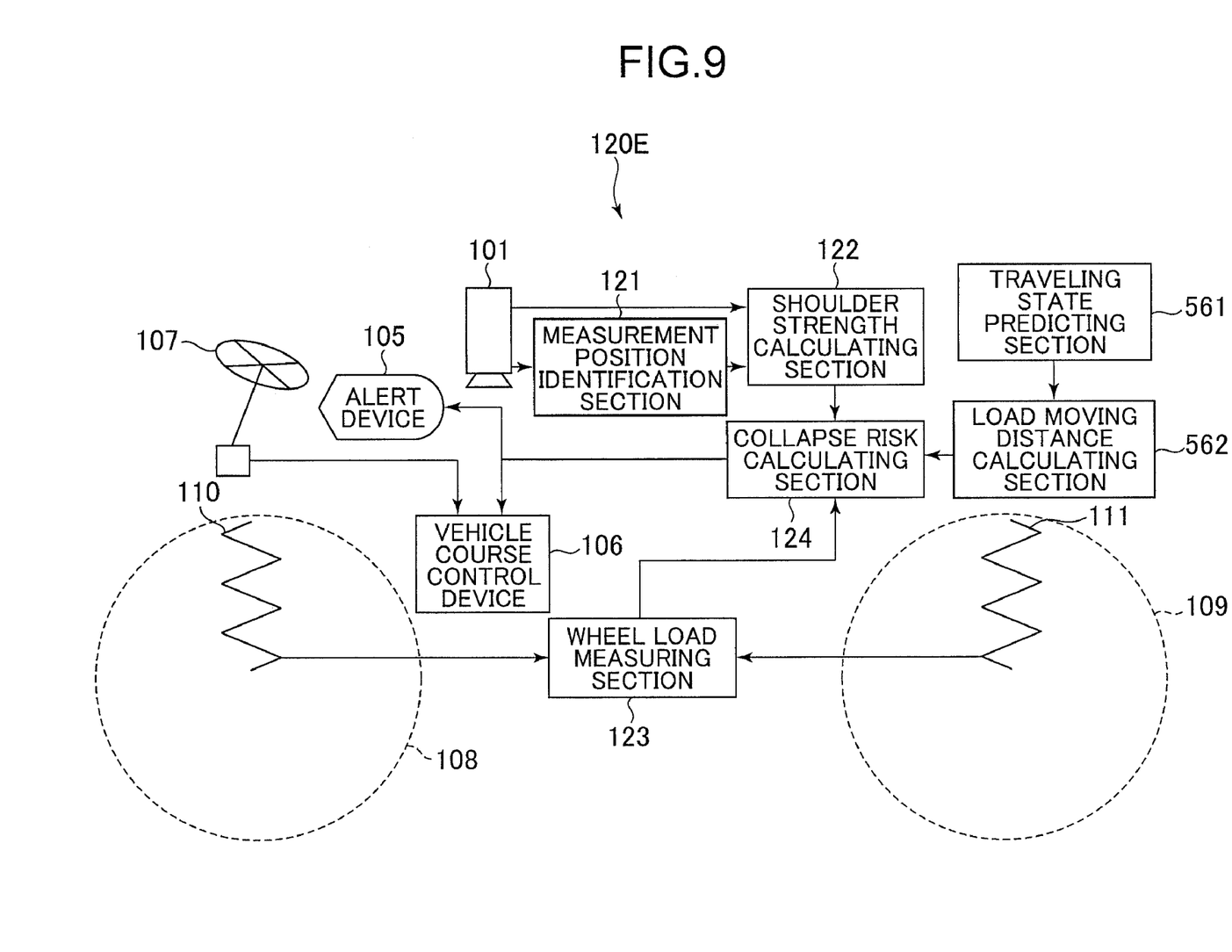
FIG. 9 is a total configuration diagram of a road shoulder collapse risk monitoring system which is a sixth embodiment of the present invention.

FIG. 9 is a total configuration diagram of a road shoulder collapse risk monitoring system which is a sixth embodiment of the present invention. The collapse risk monitoring system shown in FIG. 9 differs from that of the first embodiment in that the former includes a traveling state predicting section (traveling state predicting means) 561 and a load moving distance calculating section (load moving distance calculating means) 562.

The traveling state predicting section 561 predicts a current or future traveling state (turning state or acceleration/deceleration state) of the vehicle from the driver's operating quantity of the vehicle operating means (the steering wheel 107, the brake pedal, the accelerator pedal, or the like) or from a shape of a traveling route along which the vehicle is currently traveling or will travel in the future. In this case, the shape of the current or future traveling route along which the vehicle travels is preferably predicted from an image acquired using a camera mounted in or on the forepart of the vehicle, or from a traveling route shape stored in a navigation system. The thus-obtained operating quantity and traveling route shape are used to predict the current or future traveling state of the vehicle 112. Also, on the basis of the traveling state predicted by the traveling state predicting section 561, the load moving distance calculating section 562 calculates on a wheel-by-wheel basis a distance of load movement due to the acceleration/deceleration or turning of the vehicle.

The collapse risk calculating section 124 in the collapse risk monitoring system having the above configuration calculates the collapse risk of the shoulder by adding the load moving distance calculated by the load moving distance calculating section 562, to the wheel load measured by the wheel load measuring section 123, and then comparing the additively obtained load value with the shoulder strength calculated by the shoulder strength calculating section 122. Calculating the collapse risk in this way allows the system to determine the risk accurately, even when the wheel loads are varied by a dynamic movement of the vehicle 112 according to the calculated operating quantity and traveling route.

Figure 10:
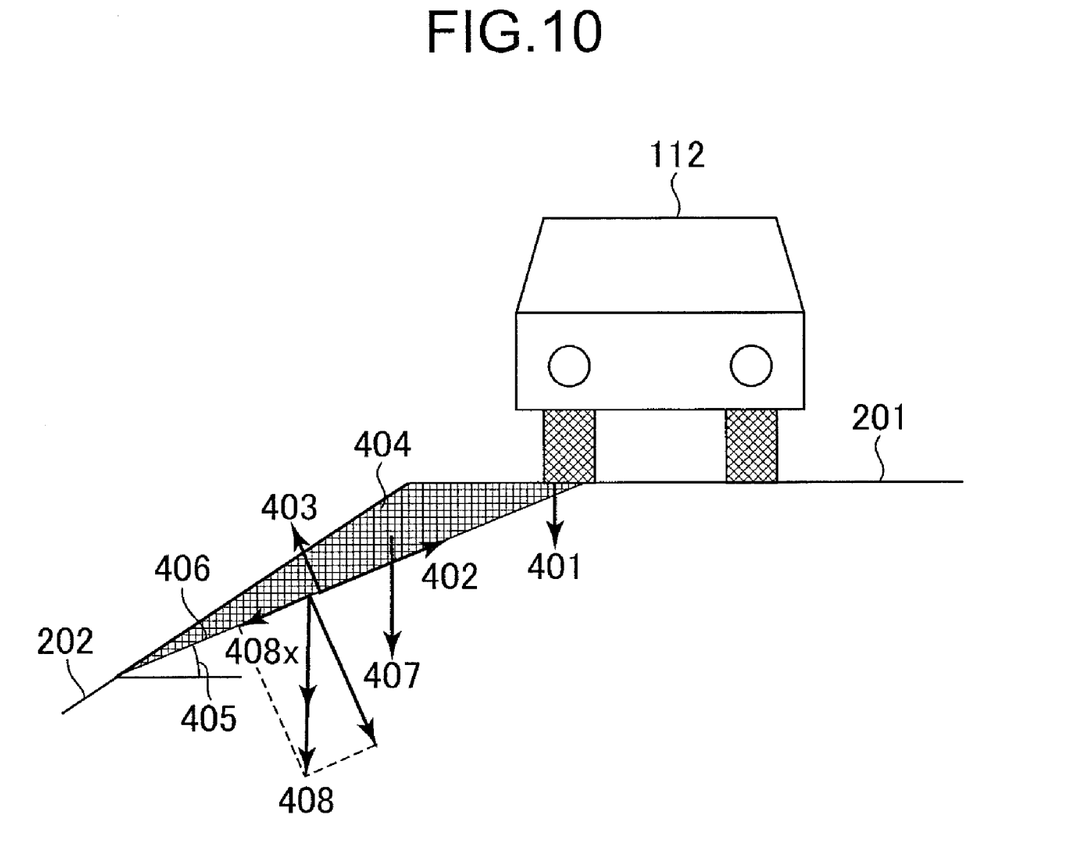
FIG. 10 is a schematic diagram showing a road shoulder strength calculation concept in a seventh embodiment of the present invention.

Next, a seventh embodiment of the present invention is described below. The present embodiment presents a more specific example of a shoulder strength calculating method in the shoulder strength calculating section 122. FIG. 10 is a diagram showing schematically a road shoulder strength calculation concept adopted in the seventh embodiment of the present invention.

Referring to FIG. 10, since an internal friction angle 405 of the shoulder (slope 202) is a value determined substantially by the kind of sediment, if the kind of sediment at the wheel position measured by the measurement position identification section 121 is known, a sliding surface 406 can be defined on the basis of the internal friction angle 405 at the wheel position. Accordingly, the shoulder strength calculating section 122 in the present embodiment defines the sliding surface 406 based on the internal friction angle 405 of the shoulder at the wheel position measured by the measurement position identification section 121, and calculates a maximum value of shear resistance 402 at the sliding surface 406, that is, shear strength, as the shoulder strength. The present embodiment assumes that as shown in FIG. 10, the shear resistance 402 is caused by a perpendicular load 403 acting upon the sliding surface 406.

The collapse risk calculating section 124 in the present embodiment calculates the collapse risk by calculating a total of a sediment load 407 exerted upon the sliding surface 406, and the wheel load 401 measured by the wheel load measuring section 123, and then comparing a component-of-force 408x directed towards the sliding surface 406 under the total load 408, with the shear strength. That is to say, in order to prevent a collapse of the sediment 404 placed at a higher position than the sliding surface 406, the shear strength generated by the perpendicular load 403 is preferably greater than the component-of-force 408x.

According to the present embodiment of the above configuration, the sediment load 407 and wheel load 401 that the sliding surface 406 needs to bear, and a load (shear strength) that can be borne using the friction of the soil at the sliding surface 406 can be theoretically derived. This implements more accurate, streamlined determination of the collapse risk.

The collapse risk information presenting means in the above description has assumed that the collapse risk calculated by the collapse risk calculating section 124 is output to the alert device 105 to present the alert information indicating that the collapse has a high risk. The shoulder collapse risk monitoring system may however be constructed so that if the collapse risk calculated by the collapse risk calculating section 124 exceeds a threshold level (this level can be different from the foregoing threshold level), the vehicle course control device 106 will change the vehicle course to reduce the collapse risk below the threshold level. This allows automatic control of the vehicle course according to the particular collapse risk.

In addition, while, in the above description, a dump truck that is a heavy-duty transport vehicle has been taken by way of example as an application of the present invention, the invention can also be obviously applied to general vehicles and other transport vehicles. Furthermore, the invention, of course, is not limited to specific examples of each of the above embodiments and can contain any design changes and modifications conducted without departing from the scope of the invention.

What is claimed is:

1. A road shoulder collapse risk monitoring system, comprising:
   shoulder shape measuring means for measuring a shape and slope angle of a road shoulder around a vehicle;
   measurement position identification means for identifying a wheel position relative to the shoulder when the shoulder shape measuring means measures the shape and slope angle of the shoulder;
   shoulder strength calculating means for calculating, from the shape and slope angle of the shoulder measured by the shoulder shape measuring means, strength of the shoulder at the wheel position identified by the measurement position identification means;
   wheel load measuring means for measuring a wheel load of the wheel whose position is identified by the measurement position identification means;
   collapse risk information presenting means for presenting information on a risk of a collapse of the shoulder at the wheel position identified by the measurement position identification means by comparing the shoulder strength calculated by the shoulder strength calculating means, with the wheel load measured by the wheel load measuring means;
   shoulder strength correction data storage means for storing a set of correction parameters used for the shoulder strength calculating means to calculate shoulder strength;
   wherein the shoulder strength calculating means calculates shoulder strength using the correction parameters,
   wherein the correction parameters correspond to a road surface state such as ground hardness, material, soil and water retention, and
   means for measuring a position of the vehicle relative to the shoulder;
   wherein the correction parameters in the shoulder strength correction data storage means are stored in association with the vehicle position; and
   wherein the shoulder strength calculating means reads out the correction parameters corresponding to the vehicle position measured by the vehicle position measuring means, from the shoulder strength correction data storage means, and then calculates shoulder strength using the read correction parameters,
   wherein the shoulder strength calculating means defines a sliding surface based on an internal friction angle of the shoulder at the wheel position measured by the measurement position identification means, calculates shear strength at the sliding surface, from the sliding surface, and the shape and slope angle of the shoulder measured by the shoulder shape measuring means, and sets the shear strength as the shoulder strength; and
   the collapse risk information presenting means presents collapse risk information on the shoulder by calculating a total of a sediment load exerted upon the sliding surface, and the wheel load measured by the wheel load measuring means, and then comparing a component-of-force directed towards the sliding surface under the total load, with the shear strength.

2. The road shoulder collapse risk monitoring system according to claim 1, further comprising:
   means for measuring a position of the vehicle relative to the shoulder;
   wherein the shoulder shape measuring means include shoulder shape information storage means in which a shape and slope angle of the shoulder at any position are stored; and
   wherein the shoulder shape measuring means read out the shape and slope angle of the shoulder at the vehicle position measured by the vehicle position measuring means, from the shoulder shape information storage means, and define the read data as the shape and slope angle of the shoulder around the vehicle.

3. The road shoulder collapse risk monitoring system according to claim 1, further comprising:
   shoulder strength correction data storage means for storing a set of correction parameters used for the shoulder strength calculating means to calculate shoulder strength;
   wherein the shoulder strength calculating means calculates shoulder strength using the correction parameters,
   wherein the correction parameters correspond to a road surface state such as ground hardness, material, soil and water retention.

4. The road shoulder collapse risk monitoring system according to claim 3, further comprising:
   means for measuring a position of the vehicle relative to the shoulder;
   wherein the correction parameters in the shoulder strength correction data storage means are stored in association with the vehicle position; and
   wherein the shoulder strength calculating means reads out the correction parameters corresponding to the vehicle position measured by the vehicle position measuring means, from the shoulder strength correction data storage means, and then calculates shoulder strength using the read correction parameters.

5. The road shoulder collapse risk monitoring system according to claim 4, further comprising:
  correction parameter measuring means for measuring a road-surface state around the vehicle and calculating the correction parameters corresponding to the road-surface state;
  wherein the shoulder strength correction data storage means stores the correction parameters calculated by the correction parameter measuring means, as new correction parameters corresponding to the measuring position of the road-surface state.

6. The road shoulder collapse risk monitoring system according to claim 1, further comprising:
  means for predicting a traveling state of the vehicle from a driver's operating quantity of vehicle operating means or from a shape of a traveling route along which the vehicle travels; and
  load moving distance calculating means for calculating an amount of a wheel load change which is generated by a dynamic movement of the vehicle according to a calculated operating quantity and traveling route based on a wheel-by-wheel basis a distance of a load movement due to acceleration/deceleration or turning of the vehicle, on the basis of the traveling state predicted by the traveling state predicting means;
  wherein the collapse risk information presenting means presents collapse risk information on the shoulder by adding the load moving distance calculated by the load moving distance calculating means, to the wheel load measured by the wheel load measuring means, and then comparing the additively obtained load value with the shoulder strength calculated by the shoulder strength calculating means.

7. The road shoulder collapse risk monitoring system according to claim 1,
  wherein the shoulder strength calculating means defines a sliding surface based on an internal friction angle of the shoulder at the wheel position measured by the measurement position identification means, calculates shear strength at the sliding surface, from the sliding surface, and the shape and slope angle of the shoulder measured by the shoulder shape measuring means, and sets the shear strength as the shoulder strength; and
  the collapse risk information presenting means presents collapse risk information on the shoulder by calculating a total of a sediment load exerted upon the sliding surface, and the wheel load measured by the wheel load measuring means, and then comparing a component-of-force directed towards the sliding surface under the total load, with the shear strength.

8. The road shoulder collapse risk monitoring system according to claim 1, further comprising:
  vehicle course control means for change a course of the vehicle when the collapse risk presented by the collapse risk information presenting means exceeds a threshold level, so that the collapse risk is reduced to the threshold level or fewer.

9. The road shoulder collapse risk monitoring system according to claim 1,
  wherein the wheel whose position is measured by the measurement position identification means is the closest front wheel to the shoulder.

10. The road shoulder collapse risk monitoring system according to claim 1,
  wherein: the wheel whose position is measured by the measurement position identification means is the closest rear wheel to the shoulder.

* * * * *